Jan. 31, 1933. R. H. ROSENBERG 1,895,772
EQUALIZED DISK BRAKE
Filed Aug. 25, 1927
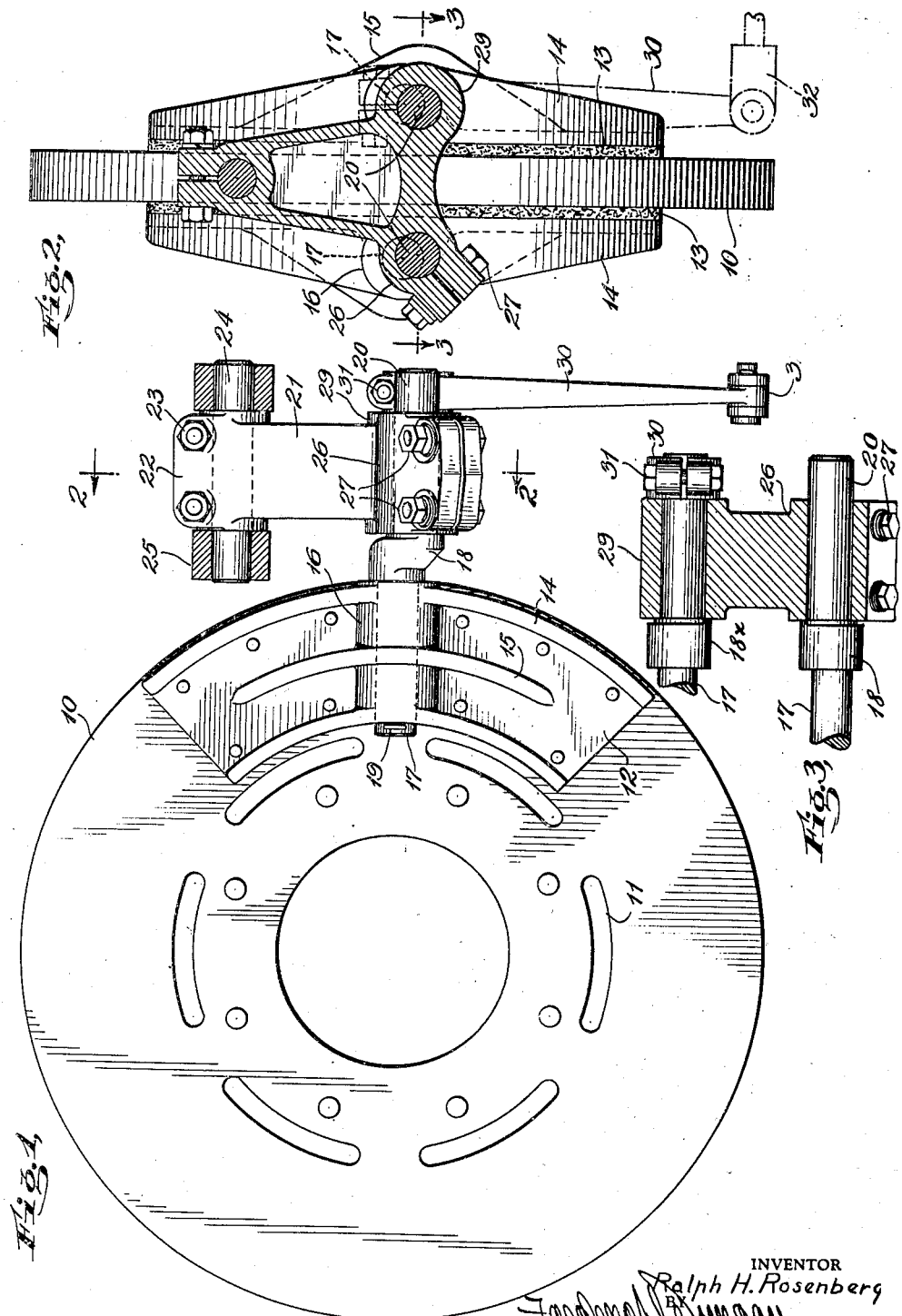
INVENTOR
Ralph H. Rosenberg
BY
ATTORNEY Patented Jan. 31, 1933

1,895,772

UNITED STATES PATENT OFFICE

RALPH H. ROSENBERG, OF SYRACUSE, NEW YORK, ASSIGNOR TO AMERICAN CABLE COMPANY, INC., A CORPORATION OF DELAWARE

EQUALIZED DISK BRAKE

Application filed August 25, 1927. Serial No. 215,374.

My invention relates to brakes for wheels or other rotary members and has for an object to provide improvements in brakes of the type in which a pair of brake shoes are adapted to grip opposite faces of a rotor.

An important feature of my invention lies in the fact that the brake shoes have a floating support so that they are free to oscillate transversely to the rotor surface, thereby permitting uniform braking action and permitting the shoes to adapt themselves to surfaces that do not lie truly normal to the axis of the rotor due to lack of truing during manufacture or assembly or due to expansion or contraction under variations of temperature.

The present invention is a modification of the invention disclosed in my co-pending application Serial No. 4,988, filed January 27, 1925, and which has eventuated in Patent #1,646,932, and it partakes of the features, advantages and objects pointed out in said application. However, the present invention is directed specifically to brakes for use with rotors of disk shape, or having disk-shaped braking portions, and in which the brake shoes engage opposite faces of the disk.

The two shoes are carried by an arm which swings on a pivot lying in the plane of the disk and means are provided for moving one shoe relative to the other, either to grip or release the disk. Since the arm which carries the shoes is free to oscillate on its pivot, equal pressure will be exerted on opposite sides of the disk when the shoes are moved into gripping position.

A feature of the present invention lies in the fact that both brake shoes are of the same form and hence are interchangeable.

In the accompanying drawing I have shown a preferred embodiment of my invention, but the drawing is to be considered in an illustrative rather than a limiting sense for it will be obvious that many changes may be made in details of construction and arrangements of parts without departing from the spirit and scope of my invention as defined in the appended claims.

In the drawing

Fig. 1 is a face elevation of my improved brake;

Fig. 2 is a view in section taken on the line 2—2 of Fig. 1; and

Fig. 3 is a view in section taken on the line 3—3 of Fig. 2.

In the particular embodiment of my invention illustrated in the drawing, I have shown my improved brake as applied to a rotor 10 of disk shape which may be secured to a shaft such, for instance, as the transmission shaft of a motor vehicle. The disk may be formed with arcuate slots 11 which will permit the passage of air to carry off heat generated by frictional engagement of the rotor with the brake shoes.

Two brake shoes 12 are provided between which the disk 10 rotates. As shown in the drawing each shoe has a flat bearing surface bounded by two radii and two arcs preferably concentric with the disk. The bearing surface of each shoe is lined with suitable braking material 13. The brake shoes consist preferably of castings, each formed on the outer face with re-inforcing flanges 14 along the arcuate margins and an intermediate flange 15. A central radially disposed boss 16 formed on the outer face of the shoe is longitudinally bored to provide a bearing for a portion 17 of an eccentric pin 18 or 18x. This provides a pivotal support for the shoe, permitting it to rock slightly so that it will adapt itself to the surface of the disk 10. The boss 16 bears against a shoulder formed on the pin 18 and the shoe is retained on the pin by means of a cotter pin 19.

The pins 18 and 18x have outwardly projecting portions 20 which are offset with respect to the portions 17. The portions 20 are mounted in bearings in an arm 21. The upper end of the arm 21 has a split bearing 22 which may be clamped by bolts 23 on a pin 24 journalled in a suitable support 25. At its lower end the arm 21 has a bearing 26 to receive the portion 20 of one of the pins 18. The bearing 26 is split and is provided with bolts 27 whereby it may be tightly clamped upon the portion 20 to prevent the latter from turning therein. Adjacent the bearing 26 the arm 21 provides a bearing 29 in which the portion 20 of the other pin 18 is journalled. To the projecting end of the portion 20 of the latter pin, is clamped an arm 30 by means of bolts 31. The free end of this arm is provided with a suitable connection 32 whereby the arm may be operated to apply the brakes.

It will be evident that by turning either of the pins 18 or 18x in the bearings in the arm 21 the shoes 12 will be adjusted toward or away from each other.

In operation, relative adjustment of the brake shoe is effected by loosening the bolts 27 and turning the pin 18 which is journalled in the bearing 26. After the proper adjustment has been obtained, the bolts 27 are tightened to maintain this adjustment. The brakes may then be applied by pulling on the connection 32 which, owing to the eccentricity of the pin to which the arm 30 is attached, causes the brake shoes to be moved toward each other, gripping the disk 10 between them. In other words, a single crank arm 30 will move both shoes into engagement with the disk, because when the arm 30 is operated to cause relative movement between the arm 21 and the right hand shoe 14, as viewed in Fig. 2, said shoe bears against the disk 10, causing the arm 21 to swing toward the right and carry the left hand shoe 14 into engagement with the disk 10. Because the arm 21 which supports the brake shoes is free to oscillate on the pin 24 the pressure exerted by the brake shoes will be equalized on opposite sides of the disk 10. By this arrangement the braking surfaces 13 will be uniformly worn down, and as the space between the surfaces 13 is increased by wear it will merely be necessary to move the arm 30 through a greater angle to apply the brakes properly on the rotor 10. When the spacing between the linings 13 becomes excessive the shoes may be adjusted toward each other as described above.

As explained in my co-pending application above referred to, an important feature of my invention lies in the fact that the brake shoes have a floating support so that direct operation of one of the shoes toward the rotor will result in moving the other shoe also in engagement with the rotor and both shoes will exert the same pressure upon opposite faces of the rotor.

By the term brake shoes, as used above and in the appended claims, I do not wish to imply that the invention is limited solely to resisting and preventing the rotation of a rotor, but would point out that when the shoes engage the rotor they resist or prevent relative rotation of the rotor and the part carrying the shoe.

Having thus described my invention what I claim as new and desire to secure by Letters Patent is:

1. The combination with a rotor having a disk portion, of a member freely movable in a direction transverse to the plane of the disk, a pair of brake shoes carried by said member upon opposite sides of the disk, and means operatively connected to one only of the shoes for moving said shoe toward the other to apply both brake shoes.

2. The combination with a rotor having a disk portion, of a member freely movable transversely to the plane of the disk, a pair of brake shoes carried by said member upon opposite sides of the disk, and means directly connected with one only of said shoes for moving said shoe toward the other to adjust the normal spacing of the shoes.

3. The combination with a rotor having a disk portion, of a member freely movable transversely to the plane of the disk, a pair of brake shoes carried by said member adjacent opposite faces of the disk, and a pin rotatably mounted in said member and having an eccentric portion for moving one of said shoes toward the other.

4. The combination with a rotor having a disk portion, of a member freely movable transversely to the plane of the disk, a pair of brake shoes carried by said member adjacent opposite faces of the disk, a pin rotatably mounted in said member and having an eccentric portion for moving one of said shoes toward the other, and an operating lever for operating said pin to apply both brake shoes to the disk.

5. The combination with a rotor having a disk portion, of a member freely movable transversely to the plane of the disk, a pair of brake shoes carried by said member adjacent opposite faces of the disk, a pin rotatably mounted in said member and having an eccentric portion for moving one of said shoes toward the other, and means for normally locking said pin against rotation.

6. The combination with a rotor having a disk portion, of a member freely movable transversely to the plane of the disk, a pair of brake shoes carried by said member adjacent opposite faces of the disk, means for moving one of said shoes relative to the other to vary the normal spacing between the shoes, and means for moving the other shoe toward the first mentioned shoe to grip the disk between said shoes.

7. The combination with a rotor having a disk portion, of a member freely movable transversely to the plane of the disk, a pair of pins journalled in said member parallel to the plane of the disk and having eccentric portions, and a pair of brake shoes pivotally mounted on said eccentric portions adjacent opposite faces of the disk, means for moving one of said shoes relatively to the other to vary the normal spacing between the shoes, and means for moving the other shoe toward the first mentioned shoe to grip the disk between said shoes.

8. The combination with a rotor having a disk portion, of a member freely movable transversely to the plane of the disk, a pair of pins journalled in said member parallel to the plane of the disk and having eccentric portions, a pair of brake shoes pivotally mounted on said eccentric portions adjacent opposite faces of the disk, and operating means directly connected to one only of said pins for rotating the latter to apply first one and eventually both brake shoes to the disk.

9. The combination with a rotor having a disk portion, of a member freely movable transversely to the plane of the disk, a pair of brake shoes carried by said member adjacent opposite faces of the disk, an eccentric normally locked against rotation but rotatable to adjust the position of one shoe, and an eccentric for moving the other shoe to grip the disk between the shoes.

10. The combination with a rotor having a disk portion, of a pair of brake shoes disposed on opposite sides of the disk, a pair of eccentric pins for supporting the brake shoes, and means for rotating one of said pins to effect relative movement of the brake shoes toward or from each other.

11. The combination with a rotor having a disk portion, of a pair of brake shoes disposed on opposite sides of the disk, a pair of eccentric pins for supporting the brake shoes, means for rotating one of said pins to effect relative movement of the brake shoes toward or from each other, and means for normally locking the other pin against rotation.

12. The combination with a disk-shaped rotor, of an arm pivotally mounted adjacent the rotor and free to swing transversely to the plane of the rotor, a pair of shoes having spaced approximately parallel surfaces and disposed on opposite sides of the disk, means for pivotally connecting one shoe to said arm with a normally fixed pivotal center, means for pivotally connecting the other shoe to said arm, and means for moving the pivotal center of the latter shoe to grip the rotor between the shoes.

13. The combination with a disk-shaped rotor, of an arm pivotally mounted adjacent the rotor and free to swing transversely to the plane of the rotor, a pair of shoes having spaced approximately parallel surfaces and disposed on opposite sides of the disk, an eccentric for adjusting one of said shoes transversely with respect to the disk and in respect to said arm, and an operating lever supported by said arm and connected to the other shoe for moving the latter transversely to the disk to grip the disk between the shoes.

14. The combination with a disk-shaped rotor, of an arm pivotally mounted adjacent the rotor and free to swing transversely to the plane of the rotor, a pair of shoes having spaced approximately parallel surfaces and disposed on opposite sides of the disk, a pair of pins carried by said arm and having eccentric portions for supporting said shoes, and means for rotating one of said pins to grip the rotor between the two shoes.

15. The combination with a disk-shaped rotor of a member having a portion freely movable transversely to the plane of the rotor, a pair of brake shoes carried by said member adjacent opposite faces of the rotor, means for effecting relative movement of said shoes toward and from the opposite faces of the rotor, said member permitting limited transverse floating movement of the two brake shoes as a unit relatively to said disk to permit equal gripping action against opposite faces of said rotor.

16. The combination with a disk-shaped rotor, of a member having a portion freely movable transversely to the plane of the disk, a pair of brake shoes disposed adjacent opposite faces of the disk, a pair of pivot pins carried by said member and supporting said brake shoes and disposed substantially parallel to the plane of the rotor, and means for moving said pivot pins to engage first one and then the other of said brake shoes with said rotor, said member permitting limited floating movement of the brake shoes as a unit relatively to said disk to insure equal gripping action of the latter on said rotor.

17. The combination with a disk-shaped rotor of an arm pivotally mounted adjacent the rotor and free to swing transversely to the plane of the rotor, a pair of brake shoes mounted pivotally on said arm and having approximately parallel surfaces and disposed respectively adjacent opposite faces of the rotor, and an operating lever pivotally connected to said arm adjacent the outer end of the latter for effecting movement of said shoes in respect to the rotor, the freedom of movement of the arm permitting bodily floating movement of said shoes relatively to the disk to effect equal gripping action of the shoes on said brake disk.

18. In combination a pair of relatively rotatable members, one including a disk portion and the other having a pair of shoes adapted to engage opposite faces of the disk, a pair of pivot pins mounted on said latter member and supporting said shoes and disposed parallel to each other and to the plane of the disk, means for moving said pivot pins to engage said shoes with said disk, and a support for said pivot pins permitting limited floating movement of said shoes as a unit with said supporting member to insure equal gripping action of the said shoes on said disk.

19. The combination with a rotor having a disk portion of a pair of brake shoes disposed one on each side of the disk and adapted to swing as a unit transversely of the plane of the disk, a pair of eccentric pins for supporting the brake shoes, at least one of said pins being rotatable to vary the distance between said brake shoes and means to effect relative movement of said brake shoes toward or from each other.

20. The combination with a rotor having a disk portion, of a supporting member, a pair of pins journalled in said member parallel to the plane of the disk and having eccentric portions, a pair of brake shoes pivotally mounted on said eccentric portions adjacent opposite faces of the disk, and operating means directly connected to one only of said pins for rotating the latter to apply both brake shoes to the disk.

In testimony whereof, I have signed this specification.

RALPH H. ROSENBERG.